United States Patent
Ko

(10) Patent No.: US 11,332,119 B2
(45) Date of Patent: May 17, 2022

(54) APPARATUS AND METHOD FOR CONTROLLING VEHICLE, AND VEHICLE SYSTEM

(71) Applicants: Hyundai Motor Company, Seoul (KR); Kia Motors Corporation, Seoul (KR)

(72) Inventor: Kyu Beom Ko, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 307 days.

(21) Appl. No.: 16/668,145

(22) Filed: Oct. 30, 2019

(65) Prior Publication Data

US 2020/0290591 A1 Sep. 17, 2020

(30) Foreign Application Priority Data

Mar. 15, 2019 (KR) ........................ 10-2019-0029818

(51) Int. Cl.
*B60W 20/13* (2016.01)
*B60W 20/11* (2016.01)
*H02J 7/00* (2006.01)

(52) U.S. Cl.
CPC ............ *B60W 20/13* (2016.01); *B60W 20/11* (2016.01); *H02J 7/007* (2013.01); *B60W 2510/244* (2013.01)

(58) Field of Classification Search
CPC ......... B60W 20/13; B60W 20/11; H02J 7/007
USPC .......................................................... 701/22
See application file for complete search history.

(56) References Cited

U.S. PATENT DOCUMENTS

| 2015/0275787 | A1* | 10/2015 | Dufford | .......... | B60W 30/18018 701/102 |
| 2020/0101864 | A1* | 4/2020 | Tsurutani | ................ | B60L 58/12 |
| 2020/0286305 | A1* | 9/2020 | Diamond | ................ | B60L 58/12 |

\* cited by examiner

*Primary Examiner* — Isaac G Smith
(74) *Attorney, Agent, or Firm* — Mintz Levin Cohn Ferris Glovksy and Popeo, P.C.; Peter F. Corless

(57) ABSTRACT

An apparatus for controlling a vehicle includes an energy predictor to predict an available energy using a battery energy based on a charging energy in battery charging and a battery energy based on a learned value of a state of health (SOH) of a battery, a distance calculator to calculate a driving range using the predicted available energy and a fuel efficiency which is previously learned, and a controller to update information on the calculated driving range.

13 Claims, 6 Drawing Sheets

| DATE | VARIATION OF SOC [%] | CHARGING ENERGY [kWh] | BATTERY ENERGY (ESTIMATED) [kWh] | LEARNED VALUE OF SOC [%] | |
|---|---|---|---|---|---|
| 3/9(INITIALLY CHARGING) | 43 | 8.8 | 20.465 | 100% | ~321 |
| 4/8 | 80.5 | 17 | 21.118 | - % | ~322 |
| 5/6 | 33.4 | 6.8 | 20.359 | - % | ~323 |
| 6/5 | 24.5 | 4.95 | 20.204 | 83% | ~324 |
| 8/4 | 52.9 | 11.6 | 21.928 | 75% | ~325 |

FIG. 3

| DATE | VALUE REFLECTED WITH AVAILABLE ENERGY | |
|---|---|---|
| | A | B |
| 3/9 (INITIALLY CHARGING) | {BATTERY ENERGY (ESTIMATED) BASED ON CHARGING ENERGY [kWh] + BATTERY ENERGY (100% * INITIAL CAPACITY) [kWh]} BASED ON LEARNED VALUE OF SOH | 100%*INITIAL CAPACITY |
| 4/8 | {PREVIOUS AVAILABLE ENERGY + BATTERY ENERGY (ESTIMATED) BASED ON CHARGING ENERGY [kWh]}/2 | 100%*INITIAL CAPACITY |
| 5/6 | {PREVIOUS AVAILABLE ENERGY + BATTERY ENERGY (ESTIMATED) BASED ON CHARGING ENERGY [kWh]}/2 | 100%*INITIAL CAPACITY |
| 6/5 | {PREVIOUS AVAILABLE ENERGY + BATTERY ENERGY (ESTIMATED) BASED ON CHARGING ENERGY [kWh] +BATTERY ENERGY (83% * INITIAL CAPACITY) [kWh] BASED ON LEARNED VALUE OF SOH}/3 | 83%*INITIAL CAPACITY |
| 8/4 | {PREVIOUS AVAILABLE ENERGY + BATTERY ENERGY (ESTIMATED) BASED ON CHARGING ENERGY [kWh] +BATTERY ENERGY (75% * INITIAL CAPACITY) [kWh] BASED ON LEARNED VALUE OF SOH}/3 | 75%*INITIAL CAPACITY |

FIG. 4

APPARATUS AND METHOD FOR CONTROLLING VEHICLE, AND VEHICLE SYSTEM

CROSS-REFERENCE TO RELATED APPLICATION

This application claims under 35 U.S.C. § 119(a) the benefit of Korean Patent Application No. 10-2019-0029818, filed in the Korean Intellectual Property Office on Mar. 15, 2019, the entire contents of which are incorporated herein by reference.

BACKGROUND

(a) Technical Field

The present disclosure relates to an apparatus and a method for controlling a vehicle, and a vehicle system.

(b) Description of the Related Art

In the case of a vehicle, such as an electric vehicle, that obtains driving force from a battery, it is important to maintain a battery level to a specific level or more. To this end, a conventional electric vehicle calculates a driving range based on a residual capacity of a battery, learned fuel efficiency, a state of health (SOH), a battery temperature, and a temperature of the external air, and transmits the driving range to a driver.

In general, a vehicle measures the SOH of a battery during charging or discharging. In particular, the vehicle may measure the SOH of the battery in tapering sections.

However, even if the battery is charged with power under the condition that the SOH is not measured, the driving range is measured using the information on the SOH learned at the earlier stage or the initial stage since the current learned SOH is missing.

In this case, even if the battery actually has an SOH of 20% or more, the vehicle erroneously recognizes the SOH as being 0%. If the driving range is calculated based on the erroneously recognized SOH, an error of 20% may be made.

Therefore, as the reliability is degraded with respect to the information on the driving range informed by the vehicle, the driving experience may be unsatisfactory.

SUMMARY

An aspect of the present disclosure provides an apparatus and a method for controlling a vehicle, and a vehicle system, capable of exactly measuring a state of health (SOH) of a battery under the condition that the SOH is not learned by calculating a driving range based on predicted battery energy, whenever the battery is charged, and thus improving the reliability of information on the driving range.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a vehicle, the vehicle includes an energy predictor to predict an available energy using a battery energy based on a charging energy in battery charging and a battery energy based on a learned value of a state of health (SOH) of a battery, a distance calculator to calculate a driving range using the predicted available energy and a fuel efficiency which is previously learned, and a controller to update information on the calculated driving range.

The energy predictor predicts the battery energy using the charging energy in the battery charging and a variation of a state of charge (SOC).

The energy predictor predicts the battery energy based on the learned value of the SOH by applying a learned value of the SOH in the battery charging to an initial capacity of the battery.

The energy predictor predicts the available energy based on an average value of the battery energy based on the charging energy and the battery energy based on the learned value of the SOH, in initially charging the battery.

The energy predictor predicts the available energy using an average value of the battery energy based on the charging energy in the battery charging, the battery energy based on the learned value of the SOH, and an available energy in previous battery charging.

The energy predictor predicts the available energy using an average value of the battery energy based on the charging energy in the battery charging, and an available energy in previous battery charging, when the learned value of the SOH is missing.

The controller transmits and output, to a display, the updated information on the calculated driving range.

The apparatus further includes an information collector to collect the charging energy in the battery charging and information on a variation of a state of charge (SOC).

According to another aspect of the present disclosure, a method for controlling a vehicle includes predicting an available energy using a battery energy based on a charging energy in battery charging and a battery energy based on a learned value of a state of health (SOH) of a battery, calculating a driving range using the predicted available energy and a fuel efficiency which is previously learned, and updating information on the calculated driving range.

The predicting of the available energy includes predicting the battery energy based on the charging energy in the battery charging and a variation of a state of charge (SOC).

The predicting of the available energy includes predicting the battery energy based on the learned value of the SOH by applying a learned value of the SOH in the battery charging to an initial capacity of the battery.

The predicting of the available energy includes predicting the available energy based on an average value of the battery energy based on the charging energy and the battery energy based on the learned value of the SOH, in initially charging the battery.

The predicting of the available energy includes predicting the available energy using an average value of the battery energy based on the charging energy in the battery charging, the battery energy based on the learned value of the SOH, and an available energy in previous battery charging.

The predicting of the available energy includes predicting the available energy using an average value of the battery energy based on the charging energy in the battery charging, and an available energy in previous battery charging, when the learned value of the SOH is missing.

The method further includes transmitting and outputting, to a display, the updated information on the driving range.

The method further includes collecting the charging energy in the battery charging and a variation of a state of charge (SOC), before predicting the available energy.

According to another aspect of the present disclosure, a vehicle system includes a battery management system, a vehicle controlling apparatus to collect charging information from the battery management system in battery charging, to predict an available energy using battery energy based on a charging energy and a battery energy based on a learned value of a state of health (SOH), to calculate a driving range using the predicted available energy and a fuel efficiency, which is previously learned, and to update the driving range, and a display configured to output the updated driving range.

BRIEF DESCRIPTION OF THE DRAWINGS

The above and other objects, features and advantages of the present disclosure will be more apparent from the following detailed description taken in conjunction with the accompanying drawings:

FIG. 3 is a view illustrating an operation of calculating available energy of the apparatus for controlling the vehicle, according to an embodiment of the present disclosure;

FIG. 4 is a view illustrating a prediction result based on the calculated available energy of the apparatus of FIG. 3.

DETAILED DESCRIPTION

Figure 1:
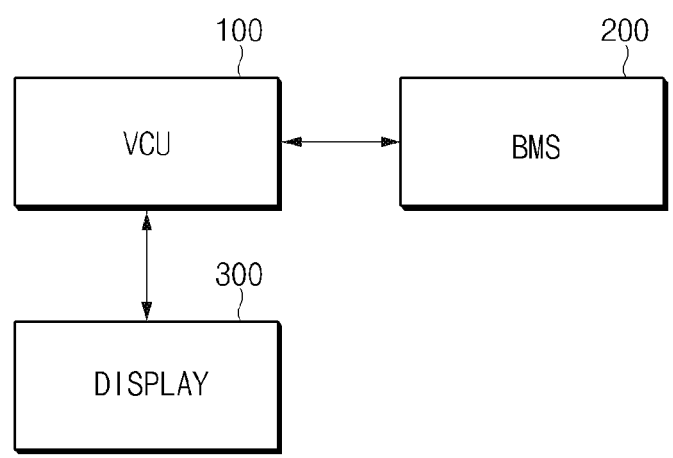
FIG. 1 is a block diagram illustrating the structure of a vehicle system, according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit" "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to an apparatus and a method for controlling a vehicle, and a vehicle system. A vehicle applied to the present disclosure may include a vehicle, such as an electric vehicle (EV) vehicle, a hybrid electric vehicle (HEV), a plug-in hybrid electric vehicle (PHEV), or the like, to drive a motor using battery energy.

FIG. 1 is a block diagram illustrating the structure of a vehicle system, according to an embodiment of the present disclosure.

Referring to FIG. 1, the vehicle system may include an apparatus (hereinafter, referred to as a "vehicle controlling apparatus") 100 for controlling a vehicle, a battery management system (BMS) 200, and a display 300.

The vehicle controlling apparatus 100 controls the overall operation of the vehicle.

Especially, the vehicle controlling apparatus 100 predicts an available energy based on a charging energy when the battery is charged and a learned value of a state of health (SOH), calculates a driving range based on the predicted available energy, and updates an existing driving range.

In this case, the vehicle controlling apparatus 100 may transmit the updated driving range to the display 300 and inform a user of the driving range.

In this case, the vehicle controlling apparatus 100 may be implemented with a vehicle control unit (VCU) inside a vehicle.

The BMS 200 performs operations related to performance of a battery, a stable operation, and an effective operation.

The BMS 200 may provide, to the vehicle controlling apparatus 100, information associated with the charging of the battery, for example, variation in a state of charge (SOC) of the battery, or battery charging energy.

The display 300 outputs specific information provided from the vehicle controlling apparatus 100. For example, the display 300 may display the information on the driving range of the vehicle. In this case, the display 300 may include a cluster (CLU) or an audio, video, navigation (AVN).

In the case, the display 300 may operate as a touch screen when including a touch sensor such as a touch film, a touch sheet, or a touch pad, and may be implemented in an integral form of an input device and an output device.

In this case, the display 300 may be implemented with at least one of a liquid crystal display (LCD), a thin film transistor-liquid crystal display (TFT LCD), an organic light-emitting diode (OLED), a flexible display, a field emission display (FED), and a three dimensional display (3D display).

According to the present disclosure, the vehicle controlling apparatus 100 may be implemented inside the vehicle. In this case, the vehicle controlling apparatus 100 may be implemented integrally with internal control units of the vehicle. Alternatively, the vehicle controlling apparatus 100 may be implemented separately from the internal control units of the vehicle and may be connected with the internal control units of the vehicle through an additional connection unit.

Figure 2:
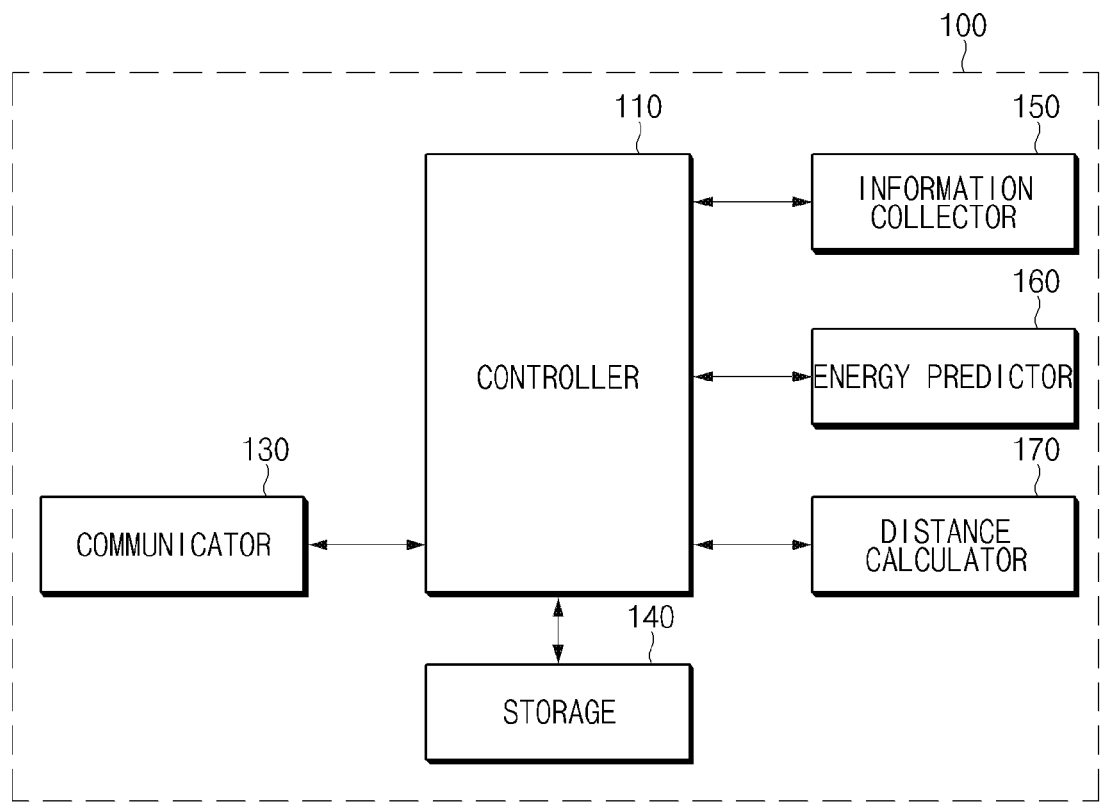
FIG. 2 is a block diagram illustrating the structure of an apparatus for controlling a vehicle, according to an embodiment of the present disclosure.

FIG. 2 is a block diagram illustrating the structure of an apparatus for controlling a vehicle, according to an embodiment of the present disclosure.

Referring to FIG. 2, the vehicle controlling apparatus 100 may include a controller 110, a communicator 130, a storage 140, an information collector 150, an energy predictor 160, and a distance calculator 170. In this case, according to the present embodiment, the controller 110, the communicator 130, the storage 140, the information collector 150, the energy predictor 160, and the distance calculator 170 may be implemented with at least one processor.

The controller 110 may process signals transmitted between the components of the vehicle controlling apparatus 100.

The communicator 130 may include a communication module for communicating with electronic parts and/or control units provided in a vehicle. For example, the communication module may communicate with the BMS 200 and may receive information associated with the battery. In addition, the communication module may communicate with the display 300 such as a cluster or an AVN and may transmit information on a driving range, which is determined at the final stage, to the display 300.

In this case, the vehicle network communication technology may include a controller area network (CAN) communication technology, a local interconnect network (LIN) communication technology, or a FlexRay communication technology.

In this case, the communicator 130 may further include a module for wireless Internet access or a module for short range communication.

The storage 140 may store data and/or algorithms necessary for the vehicle controlling apparatus 100 to operate.

For example, the storage 140 may store charging information of a battery received through the communicator 130. In addition, the storage 140 may store information on the SOH, which is learned in advance, and/or available energy information which is previously calculated.

Further, the storage 140 may store a command and/or algorithm allowing the vehicle controlling apparatus 100 to predict battery energy and to calculate available energy using the predicted battery energy and/or the learned value of the SOH.

In this case, the storage 140 may include a storage medium, such as a random access memory (RAM), a static random access memory (SRAM), a read only memory (ROM), a programmable read-only memory (PROM), an electrically erasable programmable read-memory, or the like.

The information collector 150 may collect battery information such as SOC information, or charging energy information, the learned value of the SOH and/or available energy information which is previously calculated.

The energy predictor 160 may predict the battery energy based on battery information collected by the information collector 150. For example, the energy predictor 160 may first predict battery energy using charging energy depending on the variation of the SOC. In this case, the energy predictor 160 may predict a value, which is obtained by dividing the charging energy by the variation of the SOC, as the first battery energy based on the charging energy.

In addition, the energy predictor 160 may predict second battery energy based on the learned value of the state of health (SOH) collected by the information collector 150. For example, the energy predictor 160 may predict, as the second battery energy based on the learned value of the SOH, a value obtained by subtracting the deteriorated energy from the initial energy of the battery.

The energy predictor 160 may determine the available energy using the first battery energy based on charging energy predicted above and the second battery energy based on the learned value of the SOH.

For example, the energy predictor 160 may obtain the initial available energy E0 based on Equation 1 when the battery is initially charged.

$$\text{Available energy}(E0) = (\text{Battery energy based on charging energy} + \text{battery energy based on learned value of SOH})/2 \quad \text{Equation 1}$$

As in Equation 1, the initial available energy E0 may be obtained as the average value of the first battery energy based on charging energy and second battery energy based on the learned value of the SOH.

The energy predictor 160 may obtain the first available energy E1 based on Equation 2 when there is present the learned value of the SOH, which is previously learned, when charging is performed after the initial charging.

$$\text{Available energy}(E1) = (\text{previous available energy} + \text{battery energy based on charging energy} + \text{battery energy based on learned value of SOH})/3 \quad \text{Equation 2}$$

As in Equation 2, the first available energy E1 may be obtained as an average value of the available energy calculated in previously charging, the first battery energy based on the charging energy, and the second battery energy based on the learned value of the SOH.

In this case, as the first available energy is obtained by reflecting previous available energy and battery energy based on charging energy and battery energy based on learned value of SOH at the ratio of 1:1:1, the available energy may be predicted more exactly.

Meanwhile, the energy predictor 160 may obtain the second available energy based on following Equation 3 when there is missing the learned value of the SOH, which is previously learned, in charging after initial charging.

$$\text{Available energy}(E2) = (\text{previous available energy} + \text{battery energy based on charging energy})/2 \quad \text{Equation 3}$$

As in Equation 3, the second available energy E2 may be obtained as the average value of the available energy calculated, which is previously charged, and the first battery energy based on the charging energy.

In this case, even under the condition that the SOH is not learned, the available energy is more exactly predicted by reflecting the latest value based on the moving average value.

Accordingly, embodiments in which available energy for each situation is predicted will be described with reference to FIGS. 3A and 3B.

FIG. 3 illustrates a table having information defined in association with the battery when charging the battery. The table as in FIG. 3 has information defined in the variation (%) of the SOC, charging energy (kWH), battery energy based on charging energy, and the learned value of the SOH on each charging date. Among them, the learned value of the SOH is illustrated as in reference numeral 311.

Referring to FIG. 3, when the battery is initially charged on March 9, the variation of the SOC is 43%, the charging energy is 8.8 kWH, the battery energy predicted based on the charging energy is 20.465 kWH, and the learned value of the SOH in the charging of the battery is 100% (0%; deteriorated)

The learned value of the SOH is 83% (17%; deteriorated) on June 5, as in reference numeral 324, and 75% (25%; deteriorated) on August 4 as in reference numeral 325.

Meanwhile, there is missing the learned value of the SOH as in reference numerals 322 and 323 on April 8 and May 6.

The prediction result of the available energy based on the table of FIG. 3 may be illustrated in FIG. 4. In the table of FIG. 4, an item A indicates the prediction value of the available energy according to the present disclosure, and an item B indicates the prediction value of the available energy according to a conventional scheme.

Reference numerals 332 and 333 indicate prediction values of the available energy on April 8 and May 6 having no learned value of the SOH.

According to the conventional scheme, since the SOH of the battery is not reflected in the predicted values of the available energy on April 8 and May 6 having no learned value of the SOH, the predicted values of the available energy on April 8 and May 6 are the same as the initial available energy as in reference numeral 331.

Meanwhile, according to the present disclosure, since the predicted values of the available energy on April 8 and May 6 having no learned value of the SOH are predicted using the first battery energy based on the previous available energy and the charging energy as in Equation 3, a more exact value may be obtained as compared to the conventional scheme.

Reference numerals 334 and 335 indicate prediction values of the available energy on June 6 and August 4 having learned value of the SOH.

According to the conventional scheme, the prediction values of the available energy on June 6 and August 4 having learned value of the SOH are values obtained by reflecting the learned value of the SOH in the initial battery capacity.

Meanwhile, according to the present disclosure, since the prediction values of the available energy on June 06 and August 04 having learned value of the SOH are obtained by predicting the available energy by reflecting the previous available energy, the first battery energy based on the charging energy, and the second battery energy based on the learned value of the SOH at the ratio of 1:1:1 as in Equation 2, a more exact value may be obtained as compared to the conventional scheme.

The distance calculator 170 calculates the driving range based on the available energy predicted by the energy predictor 160.

In this case, the distance calculator 170 may calculate the driving range by applying the learned fuel efficiency to any one of the initial available energy E0, the first available energy E1, or the second available energy E2.

The distance calculator 170 stores the information on the driving range in the storage 140. In this case, when there is present the information on the driving range, which is previously calculated, the distance calculator 170 updates the previously stored information with the information on the driving range which is newly calculated.

When the information on the driving range is updated, the controller 110 transmits the information on the driving range to the display 300 through the communicator 130. Therefore, the display 300 may output the driving range information received through the communicator 130 to the screen to inform the user of the driving range information.

In addition, the controller 110 may transmit the updated driving range information to a system for controlling an operation of the vehicle by utilizing the driving range information.

According to the present embodiment, each of devices of the vehicle system operating as described above may be implemented in the form of an independent hardware device including a memory and a processor to process each operation, and may be run in the form included in another hardware device such as a microprocessor or a general purpose computer system.

The flowchart of the operation of the apparatus according to the present disclosure will be described below.

Figure 5:
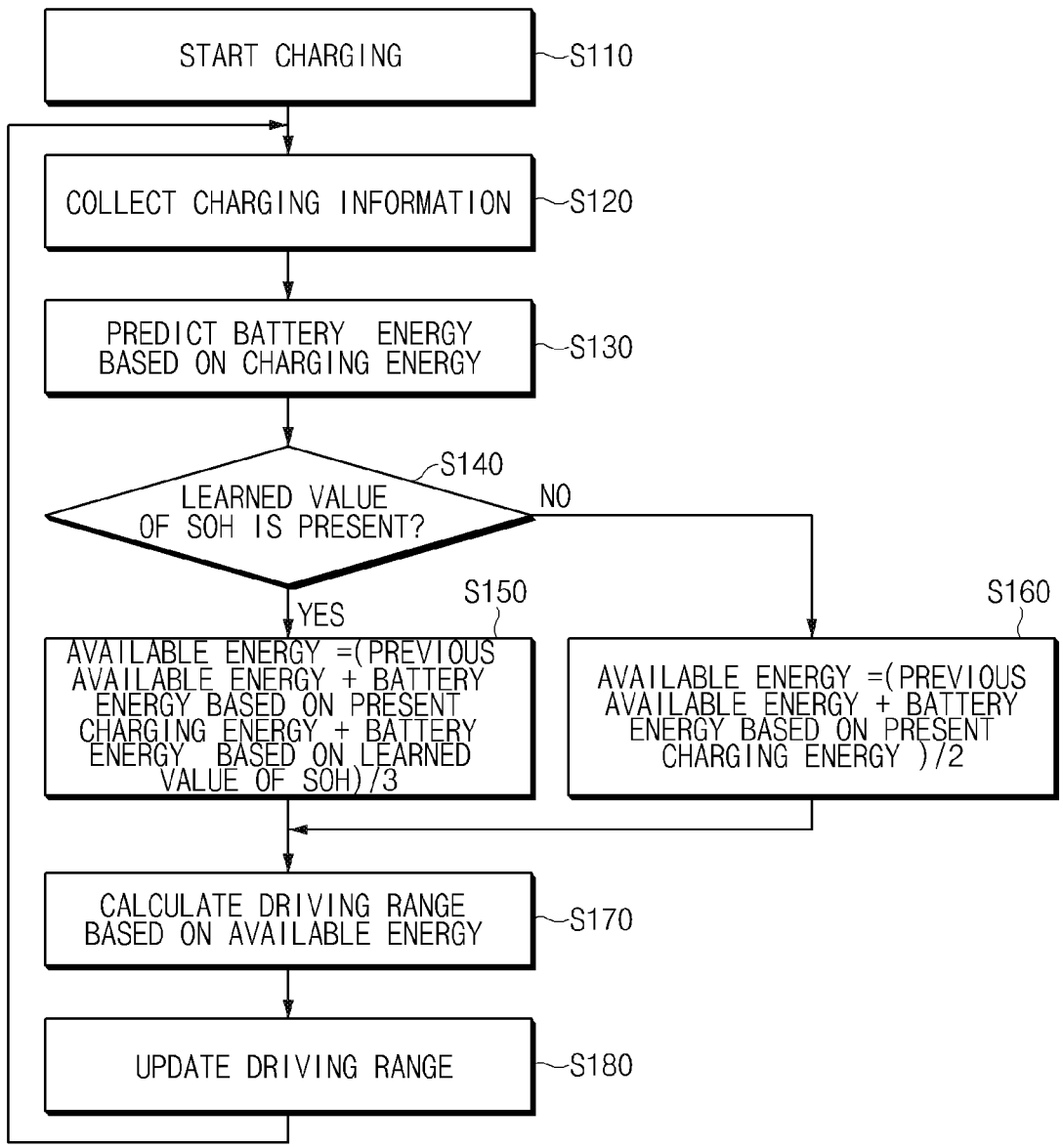
FIG. 5 is a flowchart illustrating an operation of a method for controlling a vehicle, according to an embodiment of the present disclosure.

FIG. 5 is a flowchart illustrating an operation of a method for controlling the vehicle, according to an embodiment of the present disclosure.

Referring to FIG. 5, the vehicle controlling apparatus 100 collects charging information when the charging of the battery is started (S110). In this case, the collected charging information may include a battery SOC and information on the charging energy.

The vehicle controlling apparatus 100 predicts battery energy based on charging energy collected in step S120 (S130). In this case, the vehicle controlling apparatus 100 may predict the battery energy based on a value obtained by dividing the charging energy by the variation of the SOC.

Thereafter, the vehicle controlling apparatus 100 predicts the available energy using the battery energy predicted in S130. In this case, the vehicle controlling apparatus 100 determines whether there is present the learned value of the SOH which is previously learned (S140). When there is present the learned value of the SOH, the available energy is predicted using the previous available energy, the first battery energy based on the present charging energy, and the second battery energy based on the learned value of the SOH as in Equation 2 (S150). When there is missing the learned value of the SOH, the available energy is predicted using the previous available energy and the first battery energy based on the present charging energy as in Equation 3 (S160).

In addition, in the case of the initial charging, the available energy may be predicted based on values other than the previous available energy.

When the prediction value of the available energy is obtained, the vehicle controlling apparatus 100 calculates the driving range based on the available energy (S170) and updates the information on the driving range calculated in S170 (S180).

Figure 6:
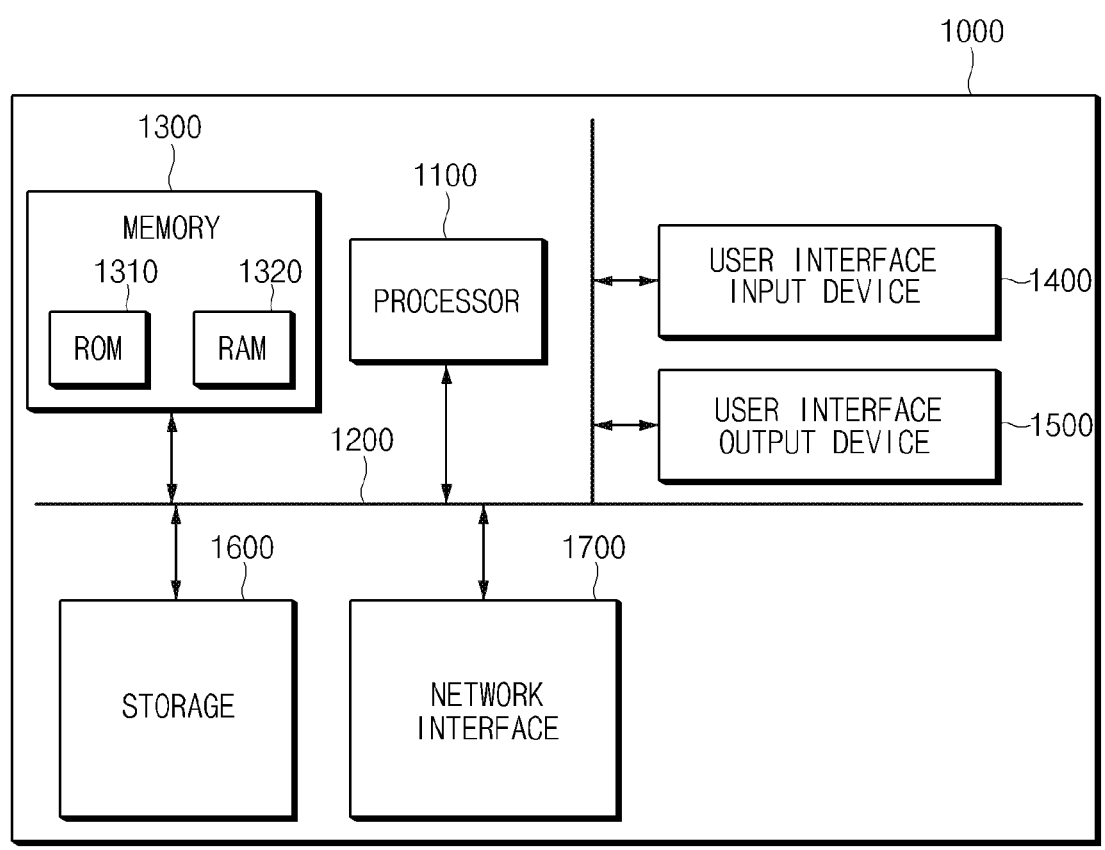
FIG. 6 is a block diagram illustrating a computing system to execute the method, according to an embodiment of the present disclosure.

FIG. 6 is a block diagram illustrating a computing system to execute the method, according to an embodiment of the present disclosure.

Referring to FIG. 6, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM; see 1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to the present disclosure, the SOH of a battery may be exactly measured by calculating a driving range based on predicted battery energy under the condition that the SOH is not learned, whenever the battery is charged, and thus improving the reliability for information on the driving range.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for controlling a vehicle, the apparatus comprising:
   a processor; and
   a non-transitory storage medium containing program instructions that, when executed by the processor, causes the apparatus to
   predict an available energy using a battery energy based on a charging energy and a battery energy based on a learned value of a state of health (SOH) of a battery;
   calculate a driving range using the predicted available energy and a fuel efficiency which is previously learned; and
   update information on the calculated driving range,
   wherein the apparatus, when executing the program instructions, is configured to:
   determine a value, which is obtained by dividing the charging energy by a variation of a state of charge (SOC), as the battery energy based on the charging energy,
   predict the available energy using an average value of the battery energy and a previous available energy, when the learned value of the SOH is not collected.

2. The apparatus of claim 1, wherein the apparatus, when executing the program instructions, is configured to predict the battery energy based on the learned value of the SOH and the learned value of the SOH in the battery charging to an initial capacity of the battery.

3. The apparatus of claim 1, wherein the apparatus, when executing the program instructions, is configured to predict the available energy based on an average value of the battery energy based on the charging energy and the battery energy based on the learned value of the SOH.

4. The apparatus of claim 1, wherein the apparatus, when executing the program instructions, is configured to predict the available energy using an average value of the battery energy based on the charging energy, the battery energy based on the learned value of the SOH, and a previous available energy.

5. The apparatus of claim 1, wherein the apparatus, when executing the program instructions, is configured to:
   transmit, to a display, the updated information on the calculated driving range.

6. The apparatus of claim 1, wherein the apparatus, when executing the program instructions, is configured to:
   collect the charging energy in the battery charging and information on a variation of a state of charge (SOC).

7. A method for controlling a vehicle, the method comprising:
   predicting, by a processor, an available energy using a battery energy based on charging energy and a battery energy based on a learned value of a state of health (SOH) of a battery;
   calculating, by the processor, a driving range using the predicted available energy and a fuel efficiency which is previously learned; and
   updating, by the processor, information on the calculated driving range,
   wherein predicting the available energy includes:
   determining a value, which is obtained by dividing the charging energy by a variation of a state of charge (SOC), as the battery energy based on the charging energy,
   predicting the available energy using an average value of the battery energy and a previous available energy, when the learned value of the SOH is not collected.

8. The method of claim 7, wherein predicting the available energy includes:
   predicting the battery energy based on the learned value of the SOH and the learned value of the SOH in the battery charging to an initial capacity of the battery.

9. The method of claim 7, wherein predicting the available energy includes:
   predicting the available energy based on an average value of the battery energy based on the charging energy and the battery energy based on the learned value of the SOH.

10. The method of claim 7, wherein predicting the available energy includes:
    predicting the available energy using an average value of the battery energy based on the charging energy in the battery charging, the battery energy based on the learned value of the SOH, and a previous available energy.

11. The method of claim 7, further comprising:
    transmitting, to a display, the updated information on the driving range.

12. The method of claim 7, further comprising:
collecting the charging energy in the battery charging and a variation of a state of charge (SOC), before predicting the available energy.

13. A vehicle system comprising:
a battery management system;
a vehicle controlling apparatus configured to:
collect charging information from the battery management system;
predict an available energy using a battery energy based on a charging energy and a battery energy based on a learned value of a state of health (SOH) of a battery;
calculate a driving range using the predicted available energy and a fuel efficiency, which is previously learned, and
update the driving range; and
a display configured to output the updated driving range,
wherein the vehicle controlling apparatus is configured to:
determine a value, which is obtained by dividing the charging energy by a variation of a state of charge (SOC), as the battery energy based on the charging energy,
predict the available energy using the battery energy based on the charging energy in the battery charging, and a previous available energy, when the learned value of the SOH is not collected.

* * * * *